Figures 1, 2:
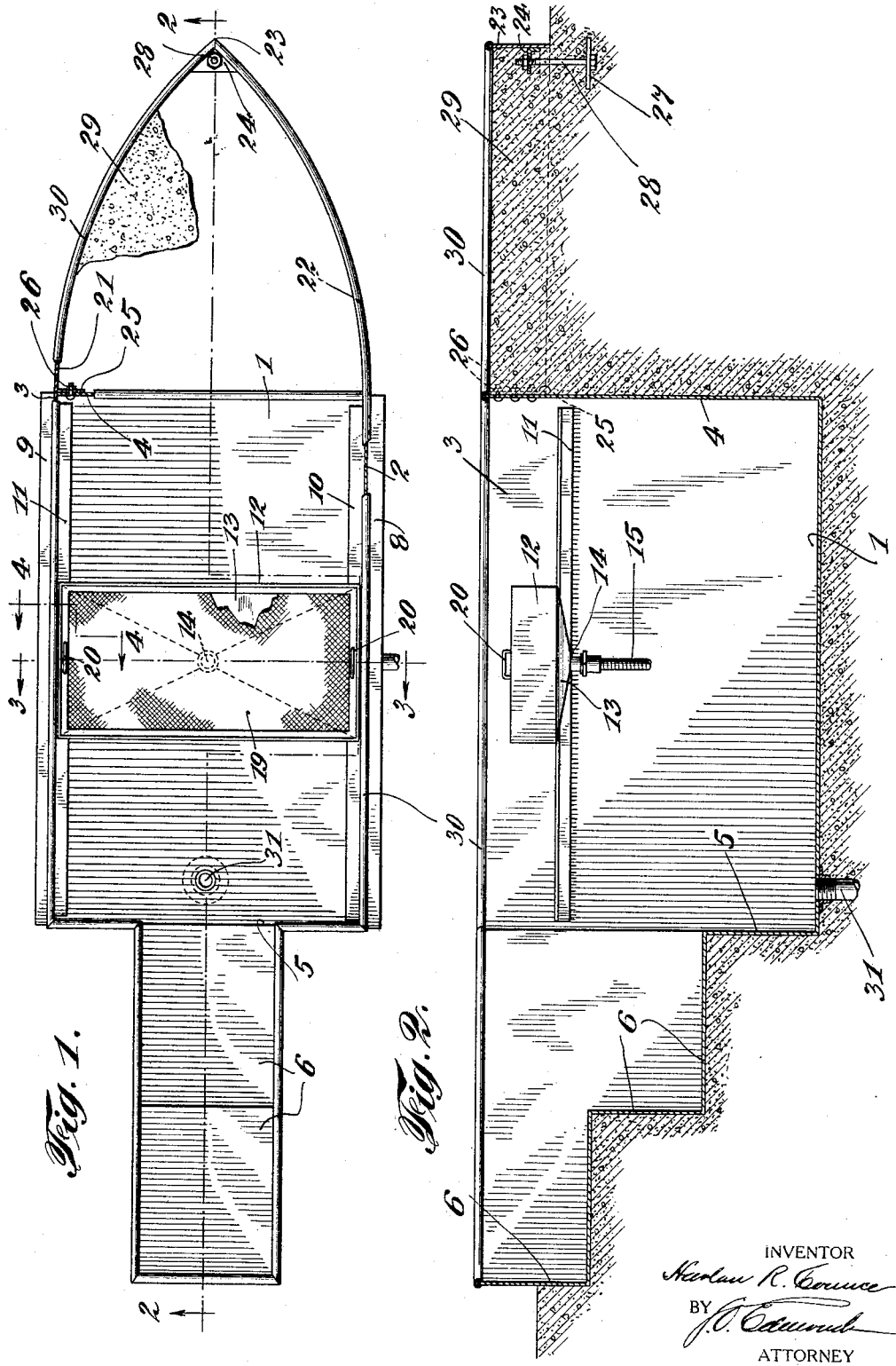

Feb. 7, 1933.　　　H. R. COUNCE　　　1,896,610
CRANK CASE PIT
Original Filed July 23, 1926　　2 Sheets-Sheet 1

INVENTOR
Harlan R. Counce
BY
ATTORNEY

Feb. 7, 1933.   H. R. COUNCE   1,896,610
CRANK CASE PIT
Original Filed July 23, 1926   2 Sheets-Sheet 2
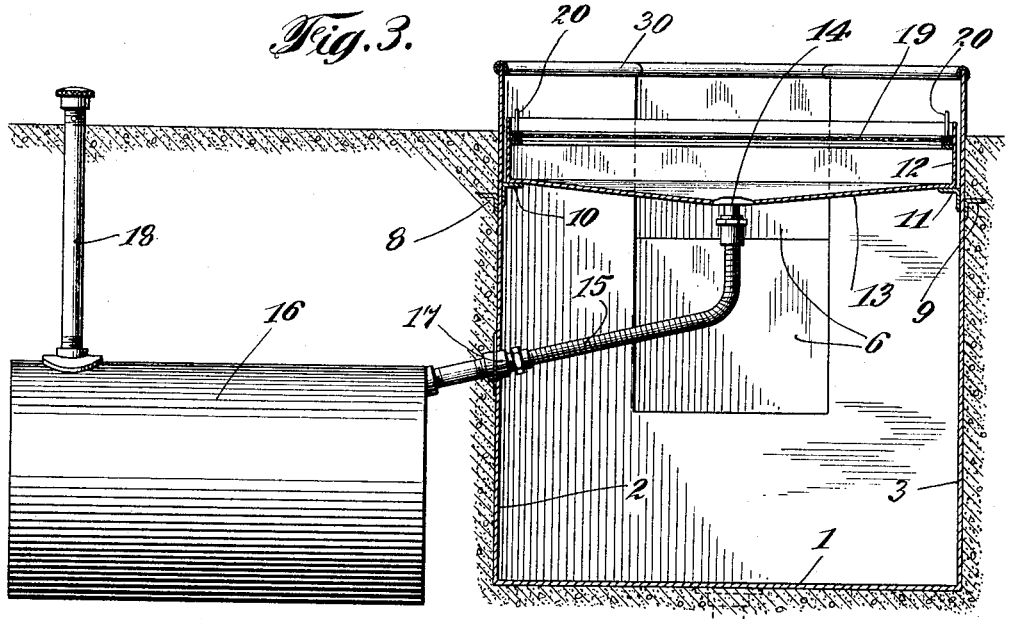
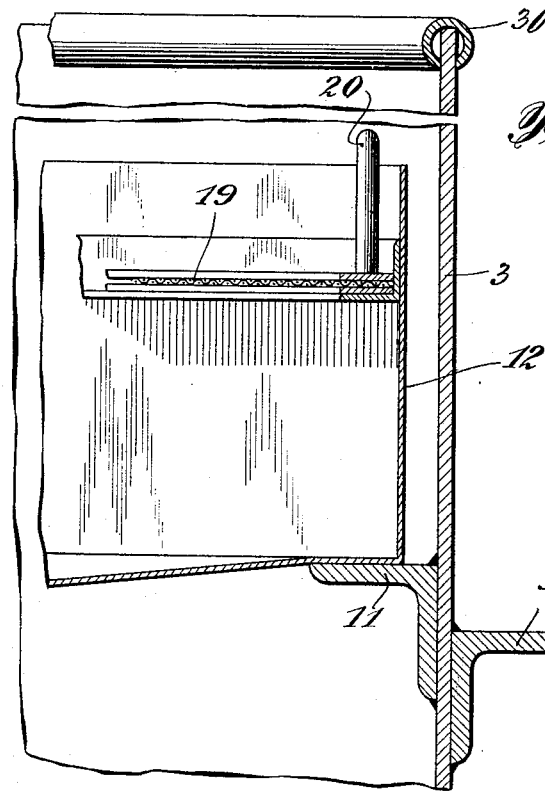
INVENTOR
Harlan R. Counce
BY
ATTORNEY

UNITED STATES PATENT OFFICE

HARLAN R. COUNCE, OF NEW ROCHELLE, NEW YORK, ASSIGNOR TO SOCONY-VACUUM CORPORATION, OF NEW YORK, N. Y., A CORPORATION OF NEW YORK

CRANK CASE PIT

Application filed July 23, 1926, Serial No. 124,475. Renewed June 25, 1932.

This invention relates to crank case pits which are intended to be used in connection with the servicing of automobiles or other vehicles, for the purpose of examining the condition of the oil in the crank case or to replenish or renew the same.

The principal object of my invention is to provide a service pit of the character referred to, and one having the advantages of being simple and sturdy in construction; adapted to be shipped in compact, knockdown form; conducive to being readily and easily assembled on the job and installed; and one which occupies small space.

A further object of this invention is to provide a pit which is roomy to work in, and one which may easily be kept clean.

A further object of my invention is to provide a crank case pit which is easy and safe to approach with an automobile or other vehicle to be serviced thereat; and provided with means for preventing the vehicle wheels from riding into the pit, and guiding the vehicle into accurate position over the pit for servicing.

Other objects of this invention will be in part obvious and in part pointed out hereinafter.

In accordance with my invention, the pit is provided with a nose or bow pointed toward the direction from which a vehicle to be serviced approaches the pit, so that if the vehicle is not steered true, the front wheels will be deflected by this nose, and the vehicle will be guided automatically into proper position over the pit for servicing. Accordingly, this bow renders it a simple matter to bring a vehicle into the proper position, and eliminates any danger of a wheel of the vehicle riding into the body of the pit.

Preferably, the bow portion of the pit is removable from the body of the pit. This permits shipment in knockdown condition and in such compact form that the pit may be conveniently transported by means of an automobile truck. The pit is equipped with a slidable drain pan, which may be conveniently adjusted into proper position to catch all the dripping from the car being serviced, without requiring the pan or any other device to be held up by the service man. The drip pan is preferably of comparatively large size, so as not to require fine adjustment, and is conducive to the maintenance of a clean condition in the pit.

In order that a clearer understanding of this invention may be had, attention is hereby directed to the accompanying drawings, forming a part of this application and illustrating certain possible embodiments of my invention.

Referring to the drawings, Fig. 1 is a top view of a pit embodying my invention; Fig. 2 is a sectional view thereof, and is taken on the line 2—2 of Fig. 1, the drip pan, however, being shown in elevation; Fig. 3 is a sectional view of the same, and is taken on the line 3—3 of Fig. 1; and Fig. 4 is an enlarged sectional view of a detail, bringing out the construction of the drip pan.

Similar reference characters refer to similar parts throughout the several views of the drawings.

Referring to the drawings, the body of the pit is composed preferably of metal plates welded together. These plates form a rectangular pit, comprising bottom 1, sides 2 and 3, front 4, and rear wall 5, which has a low portion at its center. Other plates 6 form a stepped passage downwardly into the bottom of the pit through the center of the rear wall 5. The pit with its stepped rear entrance is intended to be sunk into the ground to within approximately six inches from its top edge. Preferably, the pit is surrounded with concrete, to render the appearance more attractive and to provide concrete runways along the sides of the pit for the wheels of vehicles coming onto the pit for servicing. If desired, the sides of the pit may be reinforced by longitudinal angle iron strips 8 and 9 secured to the outside thereof beneath the ground line. Similar angle iron strips 10 and 11 may be secured along the side walls on the inside. These strips not only aid in reinforcing the walls, but also serve as slideways for a drip pan 12, which extends across the pit and slidably rests on these rails. The bottom 13 of the drip pan is preferably depressed at its center, and here provided with a drain hole, as at 14, which is connected by a flexible hose 15 to a tank 16, which may be buried alongside of the pit. As shown, this tank 16 may be connected with the flexible hose 15 by means of a coupling 17, which is positioned through one wall of the pit. Tank 16 is preferably equipped with a pipe 18, through which the contents of the tank may be pumped. Preferably, the drip pan 12 is equipped with a strainer 19; and with handles 20, whereby the drip pan may be moved easily into suitable position to catch the drainage from the automobile being serviced.

At the front of the pit is a frame comprising two curved plates 21 and 22, which meet at a point, as at 23, and are here secured together by means of a gusset plate 24. The opposite ends of these plates have flanges 25, which are bolted to the front wall 4 of the pit at opposite sides, as at 26. The point 23 of this bow portion may be anchored to the ground, or to cement, by means of an anchor plate 27, which is secured to the gusset plate 24 by means of a bolt 28. Preferably, this bow portion is filled with cracked stone, cement, or other suitable material, as shown at 29.

To eliminate any rough or sharp exposed edges which might cut or injure the tires of automobiles coming to or leaving the pit, all the exposed edges of the plates are covered by split tubes 30. These tubes present rounded surfaces, which will not injure the tires of vehicles rubbing against them.

The bottom of the pit is preferably provided with an outlet 31, through which water or other liquid will drain. This outlet is preferably connected with a suitable open drain, or may lead into a blind well, or other provision may be made for the purpose.

The machine to be serviced approaches toward the bow portion of the pit. If the vehicle is not steered true, it cannot fall into the pit because the bow portion will deflect the wheels in such a way as to cause the vehicle to come into proper position over the pit. Meanwhile, the guard 30 prevents the tires of the vehicle from being cut by the contact. When the vehicle is over the pit, the drip pan is moved into position under the drain cock of the vehicle, and when this cock is opened, the substance drained out will automatically flow into the waste tank 16. Water drained out is preferably allowed to fall to the bottom of the pit, from whence it will run out through the drain 31.

A pit constructed in accordance with the above is very neat in appearance, as well as sturdy, safe, and easily kept clean.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A pit of the character described, including a body portion and a bow portion, said bow portion comprising curved plates meeting at their front edges and extending rearwardly to opposite sides of said body portion and secured thereto, said plates constituting means for deflecting the wheels of a vehicle coming in contact therewith, and reinforcing material deposited between said plates.

2. A pit of the character described, including a sheet-metal pit portion constituting a work chamber, said pit portion having interior slideways on opposite sides thereof, and a drip pan extending between and slidably supported on said slideways.

3. A pit of the character described, including, in combination, a pit portion, said pit portion having interior slideways on opposite sides thereof, a drip pan extending between and slidably supported on said slideways, said pan having a drain opening, a drain opening in the pit, and a flexible conduit connection between the drain openings of the pan and pit.

4. A crank case pit for servicing automobiles, including, in combination, a pit portion, said pit portion having interior slideways on opposite sides thereof, a drip pan extending between and slidably supported on said slideways, said pan having a drain opening, a drain opening in the pit, and a flexible conduit connection between the drain openings of the pan and pit to permit said pan to assume various positions in said pit to accommodate itself to the position of the automobile being serviced, the drain opening in the pan being well toward the top of the pit, and the drain opening of the pit being well above the bottom of the pit but lower than the drain opening in the pan.

5. A pit of the character described, including, in combination, a pit portion, said pit portion having interior slideways on opposite sides thereof, a drip pan extending between and sildably supported on said slideways, said pan having a drain opening, a drain opening in the pit, a flexible conduit connection between the drain openings of the pan and pit, the drain opening in the pan being well toward the top of the pit, and the drain opening of the pit being well above the bottom of the pit but lower than the drain opening in the pan, and a receptacle alongside of the pit in communication with the drain opening thereof.

6. A pit of the character described, including, in combination, a pit portion, said pit portion having interior slideways on opposite sides thereof, a drip pan extending between and slidably supported on said slideways, said pan having a drain opening, a drain opening in the pit, a flexible conduit connection between the drain openings of the pan and pit, the drain opening in the pan being well toward the top of the pit, and the drain opening of the pit being well above the bottom of the pit but lower than the drain opening in the pan, and a receptacle alongside of the pit in communication with the drain opening thereof, said receptacle having an outlet through which the contents of the receptacle may be removed.

7. An automobile service pit, comprising a sheet metal box formed with integral steps at one end, a longitudinally positioned flange on each side of said box arranged interiorly thereof, a drip pan slidingly mounted on said flanges, and a draw-off tubular structure extending from the bottom of said pan to a discharge point.

8. An automobile service pit, comprising a rectangular metallic box provided with a pair of flanges exteriorly thereof between the top and bottom and a pair of interiorly positioned flanges near the top, said exterior flanges acting as anchoring means and the interior flanges acting as runways, a drain pan slidingly mounted on said interiorly positioned flanges, and means at one end of said box presenting steps leading to the bottom of the box, said means being of appreciably less width than the box.

9. An automobile service pit, comprising a metallic box structure and a metallic step structure merging into one end of the box structure, both of said structures being adapted to be embedded in the earth to almost their upper edges whereby a guiding flange is provided by said upper edges, a substantially V-shaped guiding member arranged at the end opposite the steps, and a filling for said V-shaped guiding member, said filling acting to stiffen said guiding member.

10. An automobile service pit, comprising a metallic box-like structure adapted to be embedded in the earth with its upper edges projecting above the surface of the earth to provide guiding flanges along the sides of the pit, said structure having steps at one end thereof and a wheel guiding member projecting forwardly from the upper part of the structure at the other end and having reinforcing material deposited between the wheel guiding member and the box-like structure.

11. A pit of the character described, including a body portion and a wheel deflecting portion projecting therefrom adapted to deflect the wheels of a vehicle coming in contact therewith and having a reinforcing material deposited between the wheel deflecting and body portions.

12. A pit of the character described, including a body portion and a curved wheel deflecting portion projecting therefrom adapted to deflect the wheels of a vehicle coming in contact therewith and having a reinforcing material deposited between the wheel deflecting and body portions.

13. An automobile service pit, comprising a metallic box-like structure adapted to be embedded in the earth with its upper edges projecting above the surface of the earth to provide wheel guiding flanges along the sides of the pit, said structure having steps at one end thereof and a wheel deflecting member projecting forwardly from the upper portion of the other end of the structure and having reinforcing material deposited between the wheel deflecting member and the box-like structure, and having means movable in the pit for receiving the drainage from a vehicle using the pit.

This specification signed this 19th day of July, 1926.

HARLAN R. COUNCE.